United States Patent
Park

(12) 
(10) Patent No.: US 6,456,276 B1
(45) Date of Patent: Sep. 24, 2002

(54) APPARATUS FOR RECOGNIZING POINTING POSITION IN VIDEO DISPLAY SYSTEM WITH REMOTE CONTROLLER, AND A METHOD THEREFOR

(76) Inventor: Jong-Wook Park, Seoul (KR)

(*) Notice: Subject to any disclaimer, the term of this patent is extended or adjusted under 35 U.S.C. 154(b) by 0 days.

(21) Appl. No.: 09/388,122

(22) Filed: Aug. 31, 1999

Prior Publication Data

(22) Filed:

(30) Foreign Application Priority Data

Aug. 31, 1998 (KR) ............................................. 98-35672

(51) Int. Cl.$^7$ ................................................. G09G 5/08
(52) U.S. Cl. ...................... 345/158; 345/157; 345/166; 345/169; 348/734; 348/563; 348/565; 348/569
(58) Field of Search .................................. 345/158, 166, 345/169, 157; 348/734, 563, 565, 567, 588, 705

(56) References Cited

U.S. PATENT DOCUMENTS

| | | | | |
|---|---|---|---|---|
| 5,767,919 A | * | 6/1998 | Lee et al. ................. | 345/157 |
| 6,081,255 A | * | 6/2000 | Narabu ..................... | 345/158 |
| 6,266,043 B1 | * | 7/2001 | Robin ....................... | 345/145 |

\* cited by examiner

*Primary Examiner*—Richard Hjerpe
*Assistant Examiner*—Ali Zamani

(57) ABSTRACT

An apparatus and a method for recognizing a pointing position in a video display system with a remote controller are disclosed. A plurality of optical sensors provided in a video display system are utilized to compute a position (on a picture) indicated by output signals of a remote controller, thereby executing a particular menu by the remote controller. The apparatus includes an optical receiving section for outputting different electric current values in accordance with the intensities of incoming optical beams incoming from a remote controller. Further, a switching section receives the different electric current values to output a selected electric current value in accordance with a selecting signal. An A/D converting section receives the selected electric current value from the switching section to convert it into a digital signal. A control section outputs a selecting signal to the switching section if no interrupt signal is received from a relevant sensor of the optical sensing section, for computing a position value based on an indication by the remote controller (of a user) in accordance with digital signals incoming from the A/D converting section, for outputting an interrupt signal for notifying the position data and a data input in accordance with a computed value, and for outputting a selection signal to the switching section. A menu executing section executes a user's selected menu in accordance with the interrupt signal and the position data of the control section. The functions can be easily manipulated by the user, and if there is many elements in the picture, the selection of the elements can be speedily and accurately carried out.

11 Claims, 3 Drawing Sheets

APPARATUS FOR RECOGNIZING POINTING POSITION IN VIDEO DISPLAY SYSTEM WITH REMOTE CONTROLLER, AND A METHOD THEREFOR

BACKGROUND OF THE INVENTION

1. Field of the Invention

The present invention relates to a remote signal inputting system for use in a video display apparatus. More specifically, the present invention relates to an apparatus and a method for recognizing a pointing position in a video display system with a remote controller, in which a plurality of optical sensors provided in a video display system are utilized to compute a position (on a picture) indicated by output signals of a remote controller, thereby executing a particular menu by the remote controller.

2. Description of the Prior Art

The broadcasting signals which are received into the currently used digital TV are the ones which are encoded based on MPEG2. Thus the broadcasting programs of a plurality of broadcasting stations are multiplexed in a single channel to transmit them in the form of bit streams.

Thus in the case where digital multi-channel broadcasts are realized based on MPEG2 by resorting to a communication satellite, the video and audio signals of the plurality of programs are time-division-multiplexed. Further, transport streams of the video and audio signals of as many as the number of repeaters are simultaneously transmitted.

Therefore, many programs are assigned to each channel of the video display apparatus. Accordingly, if the number of channels increases, then the number of program increases. Therefore, when a user wants to watch a broadcasting program by selecting a channel in the conventional manner, the desired channel cannot be easily found.

That is, the program information in the conventional television broadcast was supplied through newspapers, televisions, magazines and the like. However, in the digital broadcast, the number of the program channels is several scores or several hundreds, and therefore, the selection of programs by the user becomes complicated.

Therefore, the MPEG2 system provides an EPG (electronic program guide), so that the user can more easily manipulate the digital video display apparatus.

The EPG furnishes the information on the programs or on a program schedule table, so that the user can execute the desired program in an easy manner by using the remote controller.

Currently, the conception of the EPG is being gradually generalized, but the constitution of the information or data is different depending on the conditions of the broadcasting system, and is not uniform.

That is, the channel number, the name of the program and the schedule table are converted into a program schedule having a time axis and a channel axis by the EPG software of the receiving apparatus, and thus, the program schedule is displayed on the screen.

In this case, the user can directly select a broadcasting station by moving the cursor on the program schedule, and can select the feature of reserved recording and reserved watch.

In the conventional remote controller, a light emitting diode is provided so that key signals can be transmitted. Meanwhile, the video display apparatus which is controlled by key signals of the remote controller has an optical sensor. Therefore, the remote controller has a plurality of key buttons to execute the functions of the video display apparatus.

If the user presses one of the key buttons of the remote controller, then the corresponding light emitting diode blinks to transmit the relevant codes. Then the optical sensor of the video display apparatus which receives the codes measures the intensity of the incoming beams, thereby judging on the presence or absence of optical signals based on a proper standard.

If an optical signal is present, the relevant code is restored, and a menu is selected based on the restored code. Then the total system is controlled based on the selected menu.

However, when the functions of the video display apparatus are controlled by pressing the key buttons of the remote controller, as the functions of the video display apparatus are increased, the number of the key buttons of the remote controller increases.

Even when the EPG is improved to solve the above described problem, the up, down, left and right buttons are used. In this case, these buttons have to be pressed as many times as required, this being a troublesome task.

SUMMARY OF THE INVENTION

The present invention is intended to overcome the above described disadvantages of the conventional technique.

Therefore, it is an object of the present invention to provide an apparatus and a method for recognizing a pointing position in a video display system with a remote controller, in which a plurality of optical sensors provided in a video display system are utilized to compute a position (on a picture) indicated by output signals of a remote controller, thereby executing a particular menu by the remote controller.

In achieving the above object, the apparatus for recognizing a pointing position in a video display system with a remote controller according to the present invention includes: an optical receiving section for outputting different current values in accordance with intensities of incoming optical beams incoming from the remote controller; a switching section for receiving the different current values to output a selected current value in accordance with a selecting signal; an A/D converting section for receiving the selected current value from the switching section to convert it into a digital signal; a control section for outputting a selecting signal to the switching section if no interrupt signal is received from a relevant sensor of the optical sensing section, for computing a position value based on an indication by the remote controller (of a user) in accordance with digital signals incoming from the A/D converting section, for outputting an interrupt signal to notify a position data and a data input in accordance with a computed value, and for outputting a selection signal to the switching section; and a menu executing section for executing a user's selected menu in accordance with the interrupt signal and the position value of the control section.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
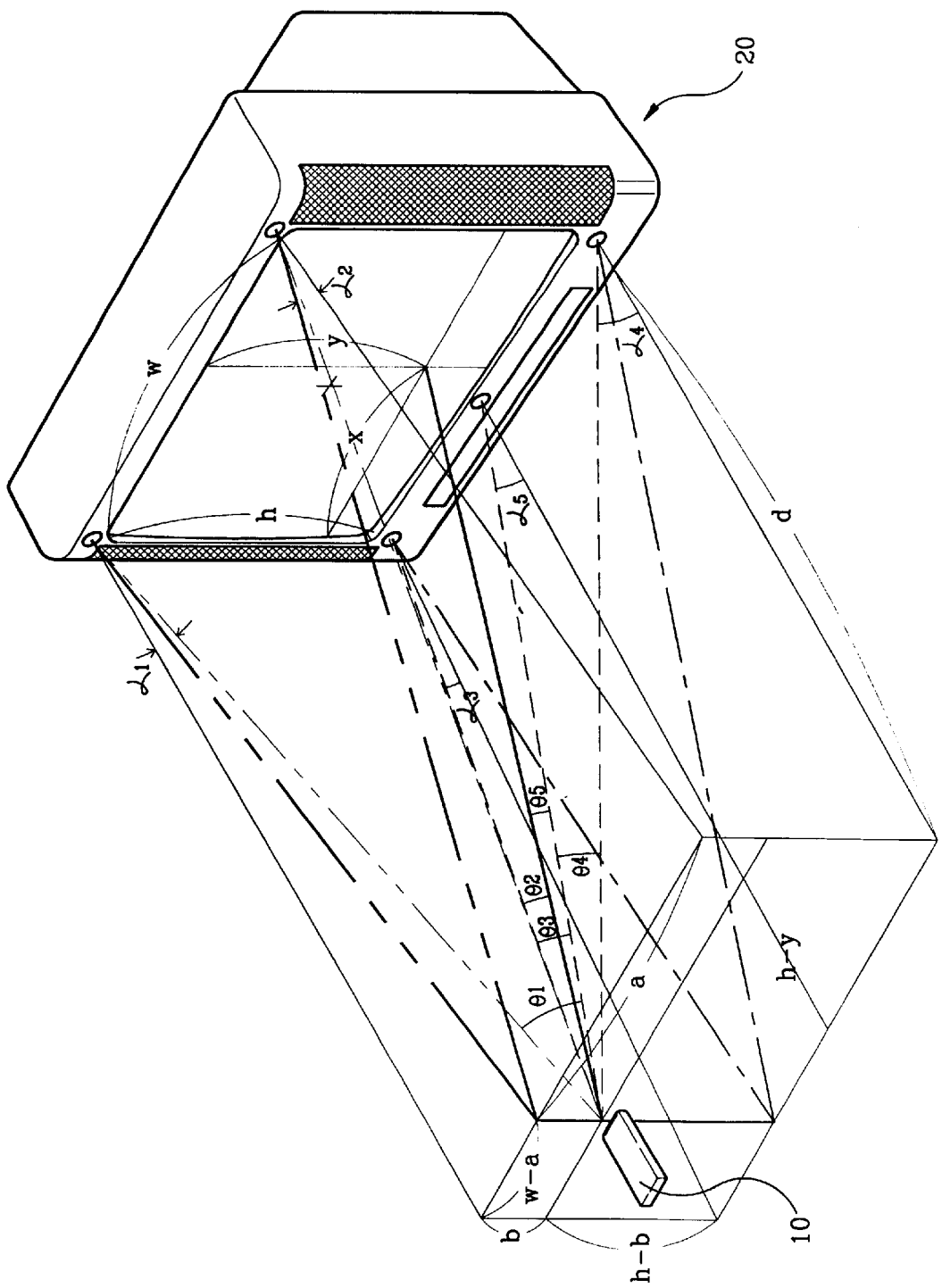
FIG. 1 illustrates a method for computing a position indicated by the remote controller of the user.

FIG. 1 illustrates a method for computing a position indicated by the remote controller of the user. As shown in this drawing, when an optical beam is received to an optical sensor of an optical receiving section 21 from a light emitting diode of a remote controller 10, the output current can be calculated based on Formula 1.

$$i = \frac{\beta Io \cos\theta \cos\alpha}{d^2} \qquad \text{<Formula 1>}$$

where d is the distance between the light emitting diode of the remote controller and the sensor, θ is the angle of the beam relative to the axis of the light emitting diode, α is the angle of the beam relative to the axis of the sensor, β is a constant, and Io is the maximum illuminance of the light emitting diode.

The application of Formula 1 will be described in detail.

For example, five optical sensors are provided in the optical receiving section 21 of a video display apparatus 20, and a schedule table is displayed on the screen of the video display apparatus 20 based on the EPG method.

In the case where the user inputs a key signal through the remote controller 10 to select a menu from the schedule table, the position of the menu can be calculated based on Formula 2.

$$i_1 = \frac{\beta_1 d(a^2 + b^2 + d^2 - ax - bh + by)}{\sqrt{d^2 + (a-x)^2 + (h-b-y)^2 (a^2 + b^2 + d^2)^2}} \qquad \text{<Formula 2>}$$

$$i_2 = \frac{\beta_1 d(a^2 + b^2 + d^2 - aw - ax - bh + by + wx)}{\sqrt{d^2 + (a-x)^2 + (h-b-y)^2 ((w-a)^2 + b^2 + d^2)^2}}$$

$$i_3 = \frac{\beta_3 d(a^2 + b^2 d^2 - ax - 2bh + by - hy)}{\sqrt{d^2 + (a-x)^2 + (h-b-y)^2 (a^2 + (h-b)^2 + d^2)^2}}$$

$$i_4 = \frac{\beta_4 d(a^2 + b^2 + d^2 + h^2 - aw - ax - 2bh + by - hy + ux)}{\sqrt{d^2 + (a-x)^2 + (h-b-y)^2 ((w-a)^2 + (h-b)^2 + d^2)^2}}$$

$$i_5 = \frac{\beta_5 d(a^2 + b^2 + d^2 + h^2 - aw/2 - ax - 2bh + by - hy + wx/2)}{\sqrt{d^2 + (a-x)^2 + (h-b-y)^2 ((w/2-a)^2 + (h-b)^2 + d^2)^2}}$$

where w and h are horizontal and vertical dimensions of the screen of the video display apparatus, a and b are horizontal and vertical positions on the picture of the remote controller, d is the distance between the screen and the remote controller, x and y are the horizontal and vertical positions of the location which is pointed by optical being on the screen.

If the five sensors of the optical receiving section 21 is arranged as shown in FIG. 1, then the adjusted position values of the remote controller 10 on the picture can be calculated by substituting the values of the currents ($i_1$–$i_5$) into the simultaneous equations of Formula 2.

The simultaneous equations as an arithmetic program are stored in a memory (not illustrated) of a control section 24, and thus, each time when the user activates the remote controller 10, a reading is made by the control section 24 to calculate the adjusted position of the remote controller 10. Based on the adjusted position, the menu is recognized by a menu executing section 25. Based on the recognized menu, the total system of the video display apparatus 20 is controlled.

Figure 2:
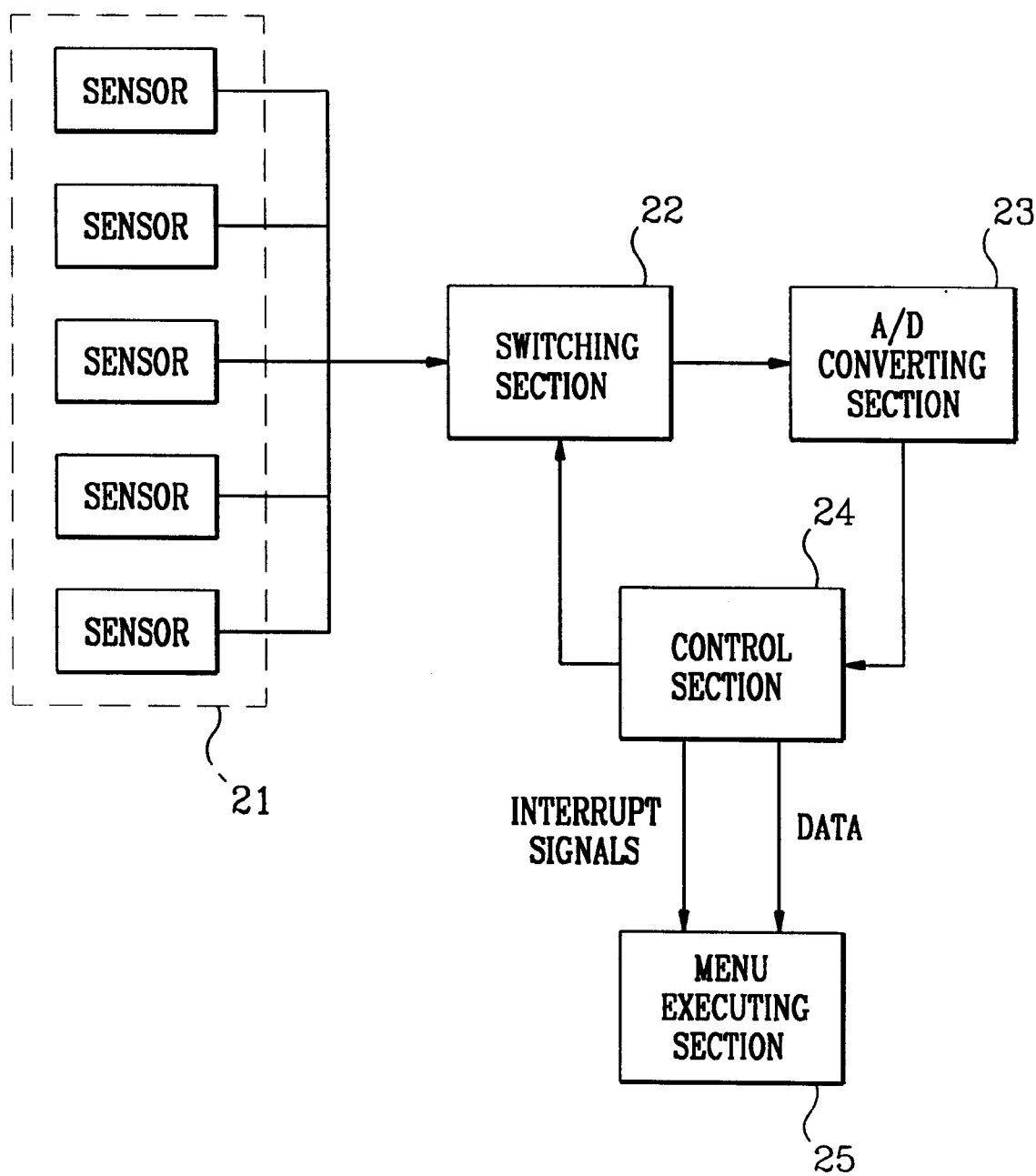
FIG. 2 is a block diagram showing the constitution of the apparatus for recognizing the pointing position of the remote controller in a video display system according to the present invention.

FIG. 2 is a block diagram showing the constitution of the apparatus for recognizing the pointing position of the remote controller in a video display apparatus 20 according to the present invention.

The optical receiving section 21 includes a plurality of optical sensors which are provided on the front face of the video display apparatus 20. The plurality of the optical sensors output different current values in accordance with the optical intensities of the beams incoming from the remote controller 10.

The most proper number of the optical sensors is five, and wherever they may be positioned, the present position of the remote controller can be calculated.

A switching section 22 consists of a multiplexer which outputs the electric current values of the optical receiving section 21 to an A/D converting section 23 in accordance with the selection signal of the control section 24.

The A/D converting section 23 converts the electric current values of the switching section 22 into digital signals.

If the incoming signals are particular key signals, then the control section 24 controls the total system based on the particular key signals of the optical receiving section 21. If no particular signal is inputted from the optical receiving section 21, the control section 24 outputs a selection signal to the switching section 22, and calculates the position value (which is indicated by the remote controller 10) in accordance with the digital signals of the A/D converting section 23. The control section 24 outputs an interrupt signal to notify the position data and the data input based on the calculated position value.

The particular signals of the optical receiving section 21 are a channel signal, a volume signal or power control signal.

The menu executing section 25 executes the selected menu from among the displayed ones which are displayed by the user onto the screen of the video display apparatus 20 in accordance with the interrupt signal or the position data of the control section 24.

Now the method for recognizing a pointing position in a video display system with a remote controller will be described referring to the attached drawings.

Figure 3:
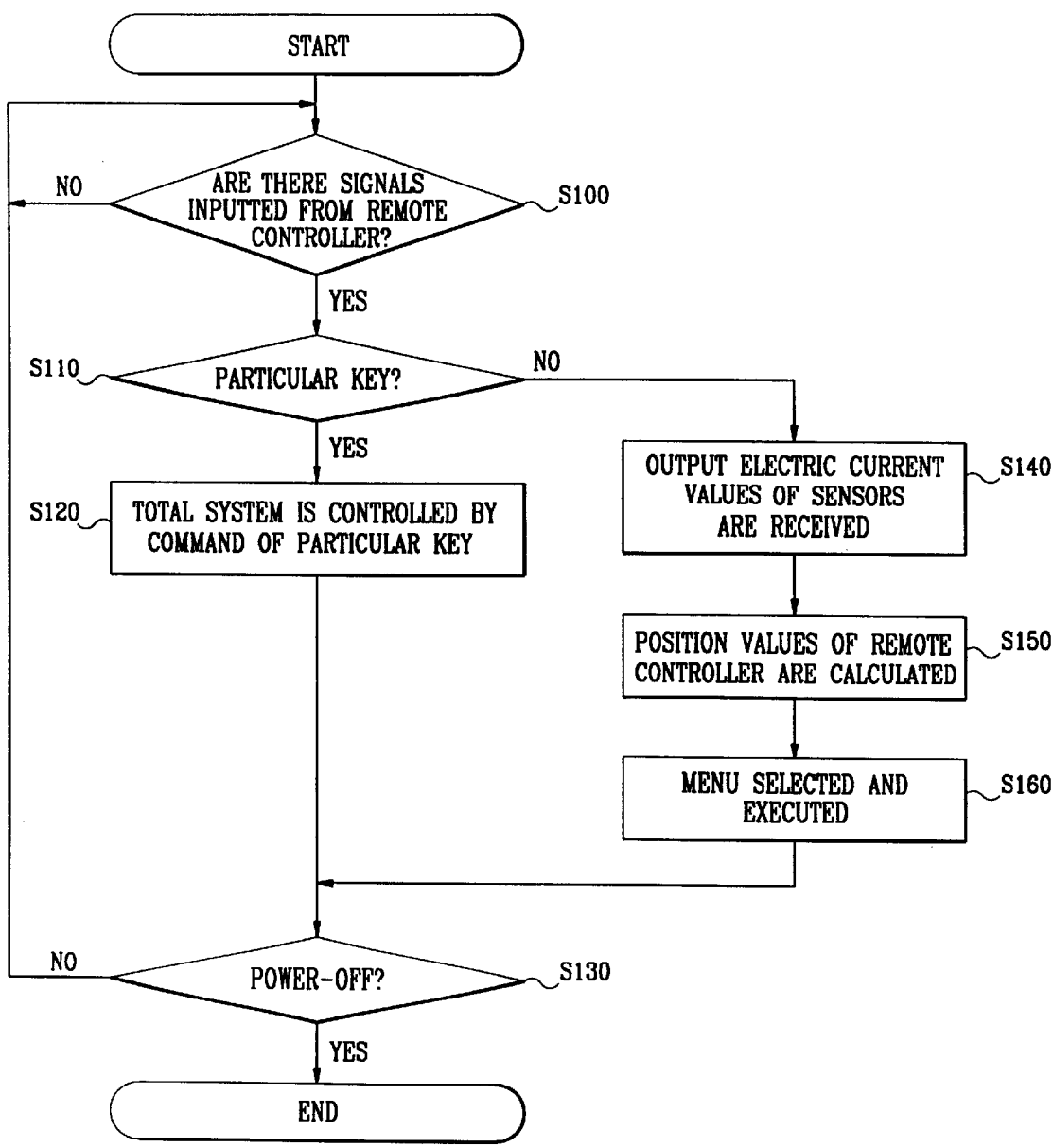
FIG. 3 is a flow chart showing the constitution of the method for recognizing the pointing position of the remote controller in a video display system according to the present invention.

FIG. 3 is a flow chart showing the constitution of the method for recognizing the pointing position of the remote controller in a video display system according to the present invention.

As shown in this drawing, the control section 24 determines whether a signal is inputted from the remote controller 10 (S100). If a signal is input, then it is determined whether the signal is a particular signal (S110).

If it is the particular signal, then the control section 24 controls the total system with a command relevant to the particular key signal (S120).

That is, if the particular signal is a channel selection signal, the present channel is replaced with the selected signal, and if it is a power-on or power-off signal, the system power is turned on or off.

Then it is determined whether a system power turning-off signal is input (S130). If it is found that a power-off signal has been input, the procedure is terminated. Otherwise, the above described procedures are repeated starting from the step S100.

If it is found at the step S110 that the particular key signal is not inputted, then the output current values ($i_1$–$i_5$) of the sensors of the optical receiving section 21 are sent through the switching section 22 to the A/D converting section 23.

Under this condition, the switching section 22 makes it possible for the A/D converting section 23 to sequentially receive the output current values of the sensors of the optical receiving section 21 by the help of the control section 24 (S140).

The output current values ($i_1$–$i_5$) are inputted into the control section 24 after being converted into digital signals by the A/D converting section 23. Then the control section 24 reads the simultaneous equations of Formula 1 from its internal memory to calculate the position values (x,y) of the remote controller 10 by substituting the output electric current values into the simultaneous equations (S150).

Then the control section reads a menu corresponding to the calculated position values (x,y) from the menu executing section 25 to control the total system (S160).

Now the procedures (S140–S160) will be described in more detail.

If the user presses a key button of the remote controller 10, a remote control signal receiving device of the video display apparatus 20 is activated.

That is, during the time when the key button is being pressed, the optical receiving section 21 receives a beam from the remote controller 10 to output a certain current value.

The output current value of the optical receiving section 21 is input into the switching section 22 and the A/D converting section 23 so as to be converted into digital signals. The control section 24 receives the digital signals to control the movements of the arrow on the picture in accordance with the key signals of the remote controller 10.

Then if the user releases his hand from the key button of the remote controller 10, the control section 24 fixes the arrow so as for it not to be moved.

Meanwhile, in a measure for the case of a long pressing of the key buttons by the user, if a short time pressing is done, the arrow is permitted to move until a long time pressing is done.

As described above, if the user adjusts the arrow to the desired position and presses the key button, the video display apparatus 20 operates in accordance with the selected menu.

That is, if the user wants to change the present channel to another channel, the user may press the key button for displaying the broadcasting program schedule table. Then the control section 24 recognizes the pressed key through a sensor of the optical receiving section 21, and then controls the menu executing section 25, thereby displaying the broadcasting program schedule table.

Here, if the user moves the arrow with the key button pressed, the optical beams from the remote controller 10 are received through the optical receiving section 21.

The plurality of the sensors of the optical receiving section 21 output mutually different electric current values in accordance with the intensities of the beams, and these electric current values are sequentially inputted into the A/D converting section 23 to be converted into digital signals.

Then the control section 24 calculates the digital signals based on an arithmetic program of a memory (not illustrated), and recognizes the position which is indicated by the remote controller. Then the arrow moves to the indicated position over the schedule table.

If the user releases the key button, the beams of the remote controller 10 are withheld from the optical receiving section 21, and therefore, the control section 24 fixes the arrow at the present position.

Meanwhile, if the key button is pressed again, the control section 24 controls the menu executing section 25, so that the menu indicated by the arrow can be executed. At the same time, the channel is changed to the selected one.

Simple functions such as the adjustment of volume are controlled by separate keys, and even these keys are provided in the smallest number as possible to simplify the constitution.

That is, the control section 24 moves the arrow by calculating the values (x,y) which are indicated by the 5 current values of the sensors. If the key buttons are selected, the video display apparatus initiates the operations of the relevant menus.

A second embodiment of the present invention is constituted as follows. That is, of the five variables, if three variables related to the user's position are set up, then two simultaneous equations indicating the position indicated by the user are formed. In this case, the position can be calculated from two sensors which are not positioned on the same line in the lateral or longitudinal direction.

In still another embodiment, the position of the user is calculated based on the first incoming optical signals. Then the adjusted position of the remote controller 10 is calculated based on the next incoming signals. This embodiment becomes possible because the location of the user does not change for a short period of time while manipulating the remote controller.

In the second embodiment of the present invention, if the values of the 5 sensors are not subordinated to one another, the position of the remote controller 10 can be selected in such a manner as to be simplest. For this, the positions of the 5 sensors can be arbitrarily adjusted.

Finally, still another embodiment can solve the simultaneous equations to calculate the position. The position value for each sensor values are stored in a form of a table, and the corresponding position to the sensor values obtained by searching a appropriate element in the table.

According to the present invention as described above, the remote controller of the present invention can replace the wired mouse of the conventional PC or notebook PC. Further, the present invention not only can control the PC remotely, but also it can be used easily and conveniently compared with the conventional touch pad, pen mouse, digitizer, the radio mouse and the ball mouse.

Accordingly, in the future, the user's menu access will become easy in the graphic user interface in the digital TV and the like. Further, as the arrow moves by the remote controller, the menu access speed can be promoted.

Further, the functions can be easily manipulated by the user, and if there is many elements in the picture, the selection of the elements can be speedily and accurately carried out.

What is claimed is:

1. An apparatus for recognizing a pointing position in a video display system with a remote controller, comprising:

an optical receiving section for outputting different electric current values in accordance with intensities of incoming optical beams incoming from said remote controller;

a switching section for receiving the different electric current values to output a selected electric current value in accordance with a selecting signal;

an A/D converting section for receiving the selected electric current value from said switching section to convert it into a digital signal;

a control section for outputting a selecting signal to said switching section if no interrupt signal is received from a relevant sensor of said optical sensing section, for computing a position value based on an indication by said remote controller (of a user) in accordance with digital signals incoming from said A/D converting section, for outputting an interrupt signal to notify the position value and a data input in accordance with a computed value, and for outputting a selection signal to said switching section; and a menu executing section for executing a user's selected menu in accordance with the interrupt signal and the position value of said control section.

2. The apparatus as claimed in claim 1, wherein said optical receiving section comprises a plurality of optical sensors.

3. The apparatus as claimed in claim 1, wherein said switching section is a multiplexer.

4. The apparatus as claimed in claim 1, wherein said control section recognizes channel adjustment, volume adjustment and power turn-on or -off signals upon receipt of an interrupt signal from a sensor of said optical receiving section, to carry out a channel up/down, a volume up/down, and a power turn-on/off.

5. The apparatus as claimed in claim 1, wherein the position values calculated from the electric current values by said control section are obtained based on Formula 2 as defined below:

$$i_1 = \frac{\beta_1 d(a^2 + b^2 + d^2 - ax - bh + by)}{\sqrt{d^2 + (a-x)^2 + (h-b-y)^2(a^2 + b^2 + d^2)^2}}$$ <Formula 2>

$$i_2 = \frac{\beta_1 d(a^2 + b^2 + d^2 - aw - ax - bh + by + wx)}{\sqrt{d^2 + (a-x)^2 + (h-b-y)^2((w-a)^2 + b^2 + d^2)^2}}$$

$$i_3 = \frac{\beta_3 d(a^2 + b^2 d^2 - ax - 2bh + by - hy)}{\sqrt{d^2 + (a-x)^2 + (h-b-y)^2(a^2 + (h-b)^2 + d^2)^2}}$$

$$i_4 = \frac{\beta_4 d(a^2 + b^2 + d^2 + h^2 - aw - ax - 2bh + by - hy + ux)}{\sqrt{d^2 + (a-x)^2 + (h-b-y)^2((w-a)^2 + (h-b)^2 + d^2)^2}}$$

$$i_5 = \frac{\beta_5 d(a^2 + b^2 + d^2 + h^2 - aw/2 - ax - 2bh + by - hy + wx/2)}{\sqrt{d^2 + (a-x)^2 + (h-b-y)^2((w/2-a)^2 + (h-b)^2 + d^2)^2}}$$

where w and h are horizontal and vertical dimensions of a screen of a video display apparatus, a and b are horizontal and vertical positions on a picture of said remote controller, d is a distance between said screen and said remote controller, and x and y are horizontal and vertical positions of location which is pointed by optical being on the screen.

6. An apparatus for recognizing a pointing position in a video display system with a remote controller, said video display system receiving broadcasting signals and displaying video signals of a selected channel in accordance with a manipulation by a user, comprising:

a remote controller for transmitting optical signals by a user's manipulations;

a front panel for protecting a display apparatus; and a plurality of optical sensors installed on said front panel, for outputting different electric current values from which receiving angles of signals of said remote controller are calculated.

7. An apparatus for recognizing a pointing position in a video display system with a remote controller, said video display system receiving broadcasting signals and displaying video signals of a selected channel in accordance with a manipulation by a user, comprising:

a remote controller for transmitting optical signals by a user's manipulations;

a front panel for protecting a display apparatus;

a plurality of optical sensors installed on said front panel, for outputting different electric current values in accordance with the receiving angles of signals of said remote controller;

a control section for outputting a selecting signal to said switching section, for computing a position value based on an indication by said remote controller (of a user) in accordance with digital signals incoming from an (A/D) converting section, and for outputting an interrupt signal to notify the position value and a data input in accordance with a computed value; and a menu executing section for executing a user's selected menu in accordance with the interrupt signal and the position value of said control section by reading a relevant menu from a menu table.

8. The apparatus as claimed in claim 7, wherein the position values calculated from the electric current values by said control section are obtained based on Formula 2 as defined below:

$$i_1 = \frac{\beta_1 d(a^2 + b^2 + d^2 - ax - bh + by)}{\sqrt{d^2 + (a-x)^2 + (h-b-y)^2(a^2 + b^2 + d^2)^2}}$$ <Formula 2>

$$i_2 = \frac{\beta_1 d(a^2 + b^2 + d^2 - aw - ax - bh + by + wx)}{\sqrt{d^2 + (a-x)^2 + (h-b-y)^2((w-a)^2 + b^2 + d^2)^2}}$$

$$i_3 = \frac{\beta_3 d(a^2 + b^2 d^2 - ax - 2bh + by - hy)}{\sqrt{d^2 + (a-x)^2 + (h-b-y)^2(a^2 + (h-b)^2 + d^2)^2}}$$

$$i_4 = \frac{\beta_4 d(a^2 + b^2 + d^2 + h^2 - aw - ax - 2bh + by - hy + ux)}{\sqrt{d^2 + (a-x)^2 + (h-b-y)^2((w-a)^2 + (h-b)^2 + d^2)^2}}$$

$$i_5 = \frac{\beta_5 d(a^2 + b^2 + d^2 + h^2 - aw/2 - ax - 2bh + by - hy + wx/2)}{\sqrt{d^2 + (a-x)^2 + (h-b-y)^2((w/2-a)^2 + (h-b)^2 + d^2)^2}}$$

where w and h are horizontal and vertical dimensions of a screen of a video display apparatus, a and b are horizontal and vertical positions on a picture of said remote controller, d is a distance between said screen and said remote controller, and x and y are horizontal and vertical positions of location which is pointed by optical being on the screen.

9. A method for recognizing a pointing position in a video display system with a remote controller, comprising the steps of:

(1) judging whether signals are input from said remote controller;

(2) judging whether the signals from said remote controller are particular signals;

(3) controlling a total system with a relevant command upon encountering the particular signals;

(4) receiving output signals of respective sensors if the particular signals from said remote controller are not input;

(5) calculating position values of said remote controller based on receiving angles of the signals of said remote controller, said receiving angles calculated from electric current values of said sensors; and (6) selecting a menu based on the calculated position values, to execute the selected menu, so as to control the total system.

10. A method for recognizing a pointing position in a video display system with a remote controller, comprising the steps of:

(1) judging whether signals are input from said remote controller;

(2) judging whether the signals from said remote controller are particular signals;

(3) controlling a total system with a relevant command upon encountering the particular signals;

(4) receiving output signals of respective sensors if the particular signals from said remote controller are not input;

(5) calculating position values of said remote controller based on electric current values of said sensors; and (6) selecting a menu based on the calculated position values, to execute the selected menu, so as to control the total system, wherein the position values calculated from the electric current values by said control section are obtained based on Formula 2 as defined below:

$$i_1 = \frac{\beta_1 d(a^2 + b^2 + d^2 - ax - bh + by)}{\sqrt{d^2 + (a-x)^2 + (h-b-y)^2(a^2 + b^2 + d^2)^2}}$$ <Formula 2>

$$i_2 = \frac{\beta_1 d(a^2 + b^2 + d^2 - aw - ax - bh + by + wx)}{\sqrt{d^2 + (a-x)^2 + (h-b-y)^2((w-a)^2 + b^2 + d^2)^2}}$$

$$i_3 = \frac{\beta_3 d(a^2 + b^2 d^2 - ax - 2bh + by - hy)}{\sqrt{d^2 + (a-x)^2 + (h-b-y)^2(a^2 + (h-b)^2 + d^2)^2}}$$

$$i_4 = \frac{\beta_4 d(a^2 + b^2 + d^2 + h^2 - aw - ax - 2bh + by - hy + ux)}{\sqrt{d^2 + (a-x)^2 + (h-b-y)^2((w-a)^2 + (h-b)^2 + d^2)^2}}$$

$$i_5 = \frac{\beta_5 d(a^2 + b^2 + d^2 + h^2 - aw/2 - ax - 2bh + by - hy + wx/2)}{\sqrt{d^2 + (a-x)^2 + (h-b-y)^2((w/2-a)^2 + (h-b)^2 + d^2)^2}}$$

where w and h are horizontal and vertical dimensions of a screen of a video display apparatus, a and b are horizontal and vertical positions on a picture of said remote controller, d is a distance between said screen and said remote controller, and x and y are horizontal and vertical positions of a location which is pointed to by optically being located on the screen.

11. The apparatus of claim 1, wherein the control section receives the digital signal from the A/D converting section and controls a movement of an arrow based on the digital signal, wherein the arrow does not move when a button of said remote controller is released.

* * * * *